United States Patent
Brouillet

(10) Patent No.: US 7,373,771 B2
(45) Date of Patent: May 20, 2008

(54) COOLING ARRANGEMENT FOR AN ACCESSORY GEARBOX AND METHOD OF COOLING

(75) Inventor: David Brouillet, St. Basile Le Grand (CA)

(73) Assignee: Pratt & Whitney Canada Corp., Longueuil, Québec (CA)

( * ) Notice: Subject to any disclaimer, the term of this patent is extended or adjusted under 35 U.S.C. 154(b) by 540 days.

(21) Appl. No.: 10/886,603

(22) Filed: Jul. 9, 2004

(65) Prior Publication Data

US 2006/0005547 A1    Jan. 12, 2006

(51) Int. Cl.
*F02C 7/16* (2006.01)
*F02C 7/32* (2006.01)

(52) U.S. Cl. ............... 60/39.08; 60/39.83; 60/802; 184/6.11

(58) Field of Classification Search .......... 60/39.08, 60/39.83, 788, 806, 802; 184/6, 11
See application file for complete search history.

(56) References Cited

U.S. PATENT DOCUMENTS

| | | | |
|---|---|---|---|
| 2,696,712 A * | 12/1954 | Lewis | 60/39.83 |
| 2,862,119 A | 11/1958 | Else et al. | |
| 3,260,872 A | 7/1966 | Potter | |
| 3,623,546 A * | 11/1971 | Banthin et al. | 60/39.83 |
| 3,775,974 A | 12/1973 | Silver | |
| 3,859,785 A * | 1/1975 | Leto et al. | 60/39.83 |
| 4,041,697 A | 8/1977 | Coffinberry et al. | |
| 4,166,361 A | 9/1979 | Earnest et al. | |
| 4,284,913 A | 8/1981 | Barnhardt | |
| 4,514,652 A | 4/1985 | Olson | |
| 4,525,995 A | 7/1985 | Clark | |
| 4,555,902 A * | 12/1985 | Pilarczyk | 60/39.83 |
| 4,713,982 A | 12/1987 | Fluegel | |
| 4,764,699 A | 8/1988 | Nold | |
| 5,034,638 A | 7/1991 | McCabria | |
| 5,034,639 A | 7/1991 | Huss et al. | |
| 5,359,247 A | 10/1994 | Baldwin | |
| 5,418,412 A | 5/1995 | Brucker | |
| 5,553,449 A | 9/1996 | Rodgers et al. | |
| 5,695,007 A | 12/1997 | Fauconnier et al. | |

FOREIGN PATENT DOCUMENTS

| | | |
|---|---|---|
| EP | 1 479 889 A2 | 11/2004 |
| JP | 11 182264 | 7/1999 |
| WO | WO-98/55738 | 12/1998 |

* cited by examiner

*Primary Examiner*—L. J. Casaregola
(74) *Attorney, Agent, or Firm*—Ogilvy Renault LLP

(57) ABSTRACT

The accessory gearbox (AGB) has at least one coolant passage between the AGB and the accessory for externally cooling the accessory without coolant flow inside the accessory.

10 Claims, 5 Drawing Sheets

COOLING ARRANGEMENT FOR AN ACCESSORY GEARBOX AND METHOD OF COOLING

TECHNICAL FIELD

The technical field of the invention relates generally to cooling arrangements and methods of cooling, more particularly to a cooling arrangement for an accessory used in an accessory gearbox of a gas turbine engine and a method of cooling the accessory.

BACKGROUND

Typically, gas turbine engines are equipped with various mechanically-driven accessories which are connected to a casing referred to an accessory gearbox (AGB).

Some accessories are generating intense heat during their operation and for this reason, they require cooling. Typically, oil in the AGB is used for cooling the accessories, particularly the starter/generator unit. Oil passages are provided inside the starter/generator unit and heat is exchanged between the oil and the internal parts of the starter/generator unit. This arrangement has been used in the past in an extensive number of designs. However, it requires oil connectors between the AGB and the electrical device, and also internal oil passages in the electrical device.

SUMMARY

A first aspect of the present invention relates to a cooling system for accessory gearbox (AGB) of a gas turbine engine, the AGB having an internal wall surface defining a housing in which is located an accessory having an external side surface radially inward of the internal wall, the cooling system comprising:
  at least one coolant fluid passage located between the internal wall surface of the AGB and the external side surface of the accessory, the passage extending from at least one inlet to at least one outlet, the inlet and outlet being in fluid communication with a coolant fluid circuit.

Another aspect of the present invention relates to a method of cooling a gas turbine accessory comprising the steps of:
  circulating engine oil from an engine oil circuit around the outside of the accessory, and
  circulating the oil within the engine to provide at least one of cooling and lubrication to at least one other part of the engine.

Still other features and advantages of the present invention will be better understood with reference to the preferred embodiments described hereinafter.

DETAILED DESCRIPTION

Figure 1:
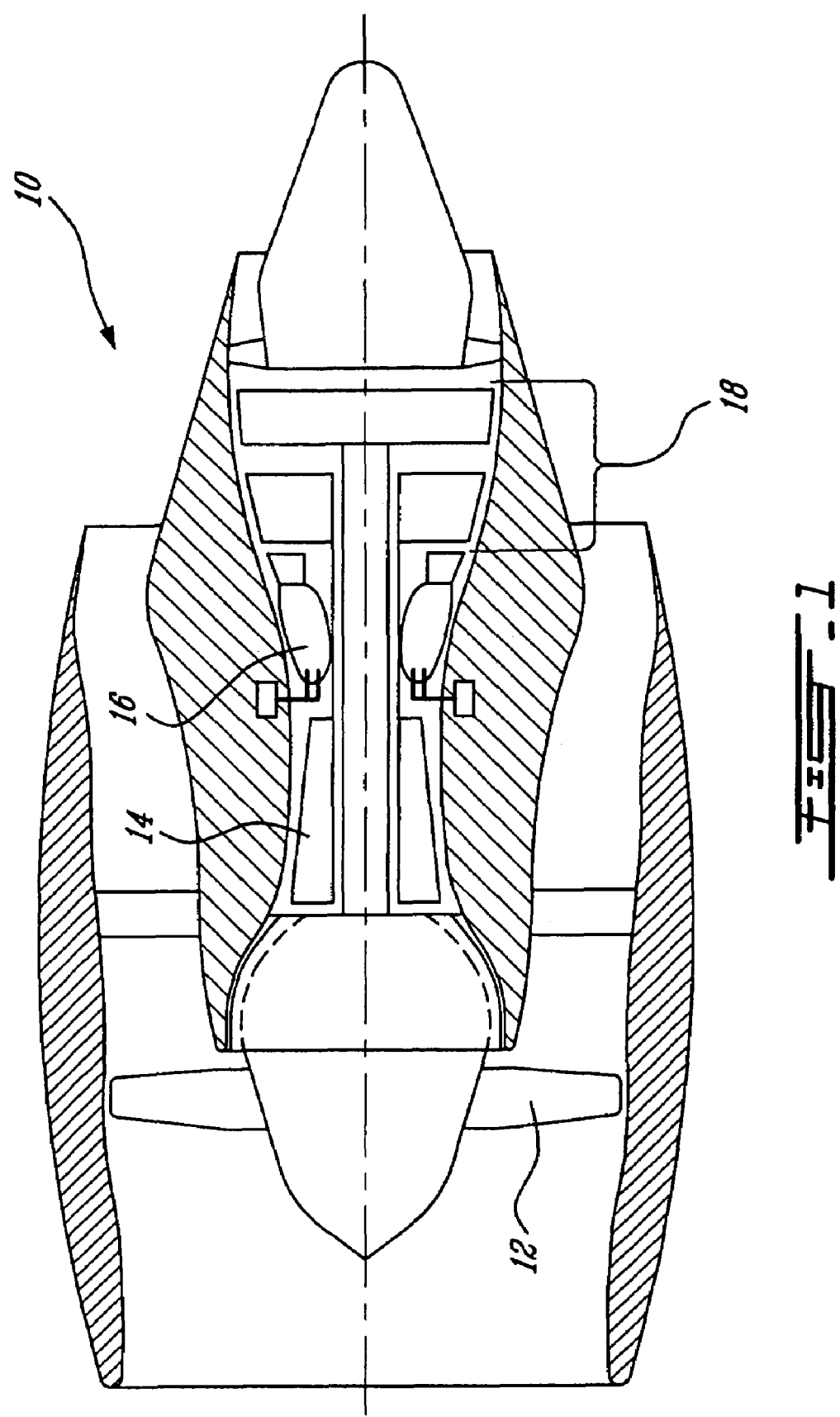
FIG. 1 schematically shows a generic gas turbine engine to illustrate an example of a general environment in which is located an accessory gearbox.

FIG. 1 illustrates an example of a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

Figure 2:
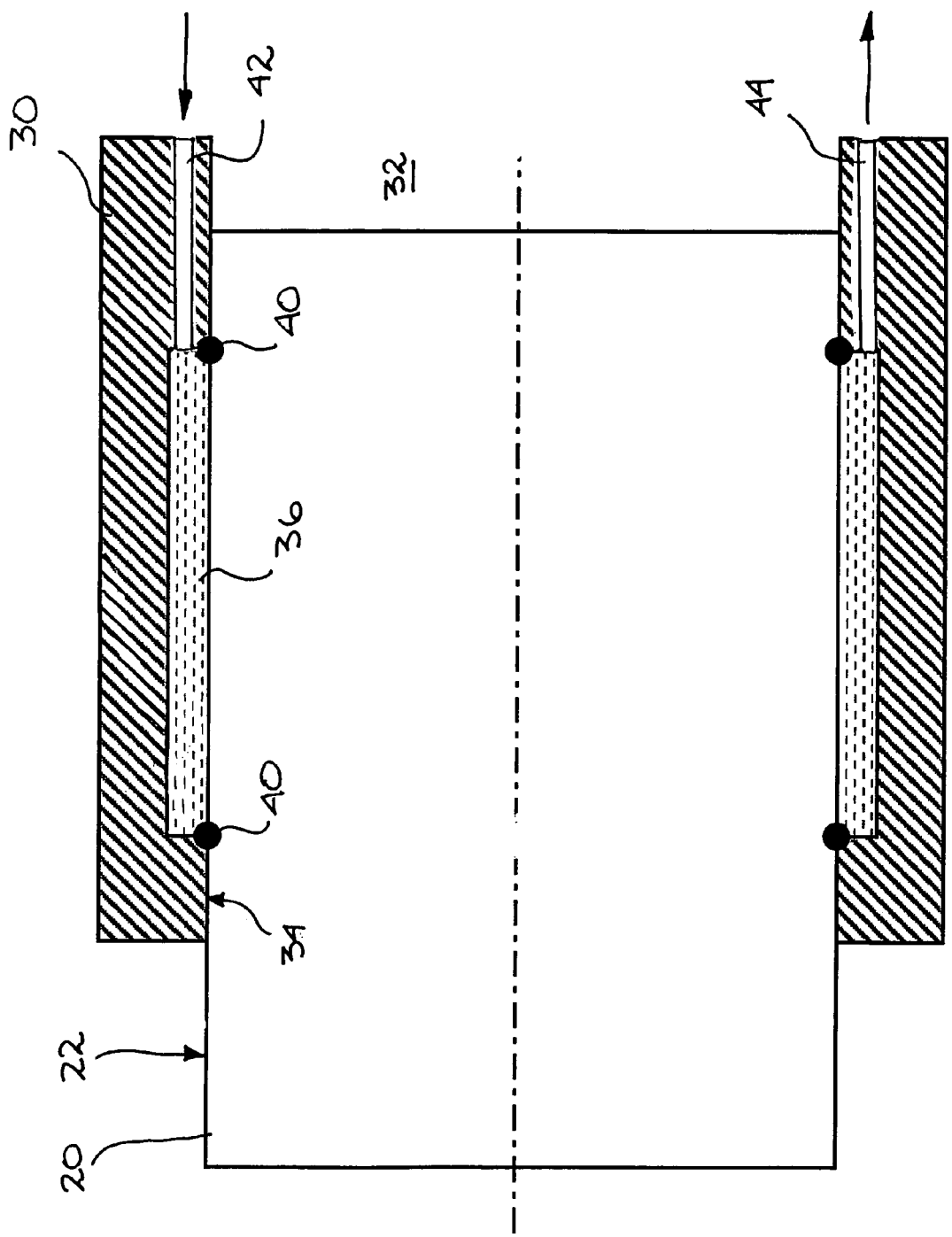
FIG. 2 is a schematic cross-sectional view of an accessory located in a housing of an accessory gearbox incorporating the new arrangement.

FIG. 2 schematically illustrates an accessory or other gas turbine-mounted device 20, such as a starter, generator or starter-generator unit, which is secured into an accessory gearbox (AGB) 30. The accessory 20 is partially embedded within a housing 32 of the AGB 30, thus having a significant amount, and preferably more than half, of its volume within the housing 32. The housing 32 of the AGB 30 is generally internally defined by an internal wall surface 34. This internal wall surface 34 is preferably shaped and configured to sealingly receive the external side surface 22 of the accessory 20.

Figure 3:
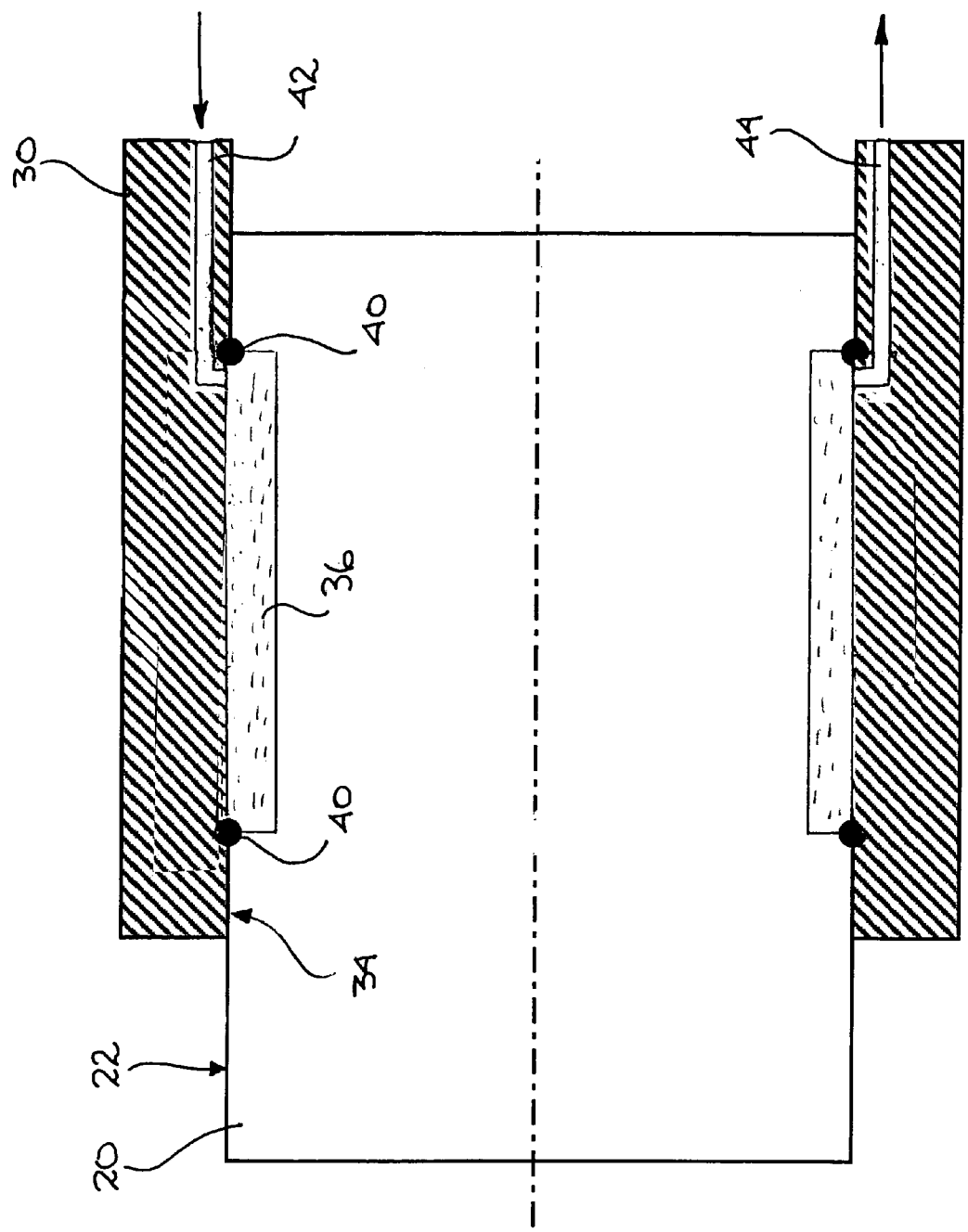
FIG. 3 is a view similar to FIG. 2, showing a variant of the new arrangement.
Figure 4:
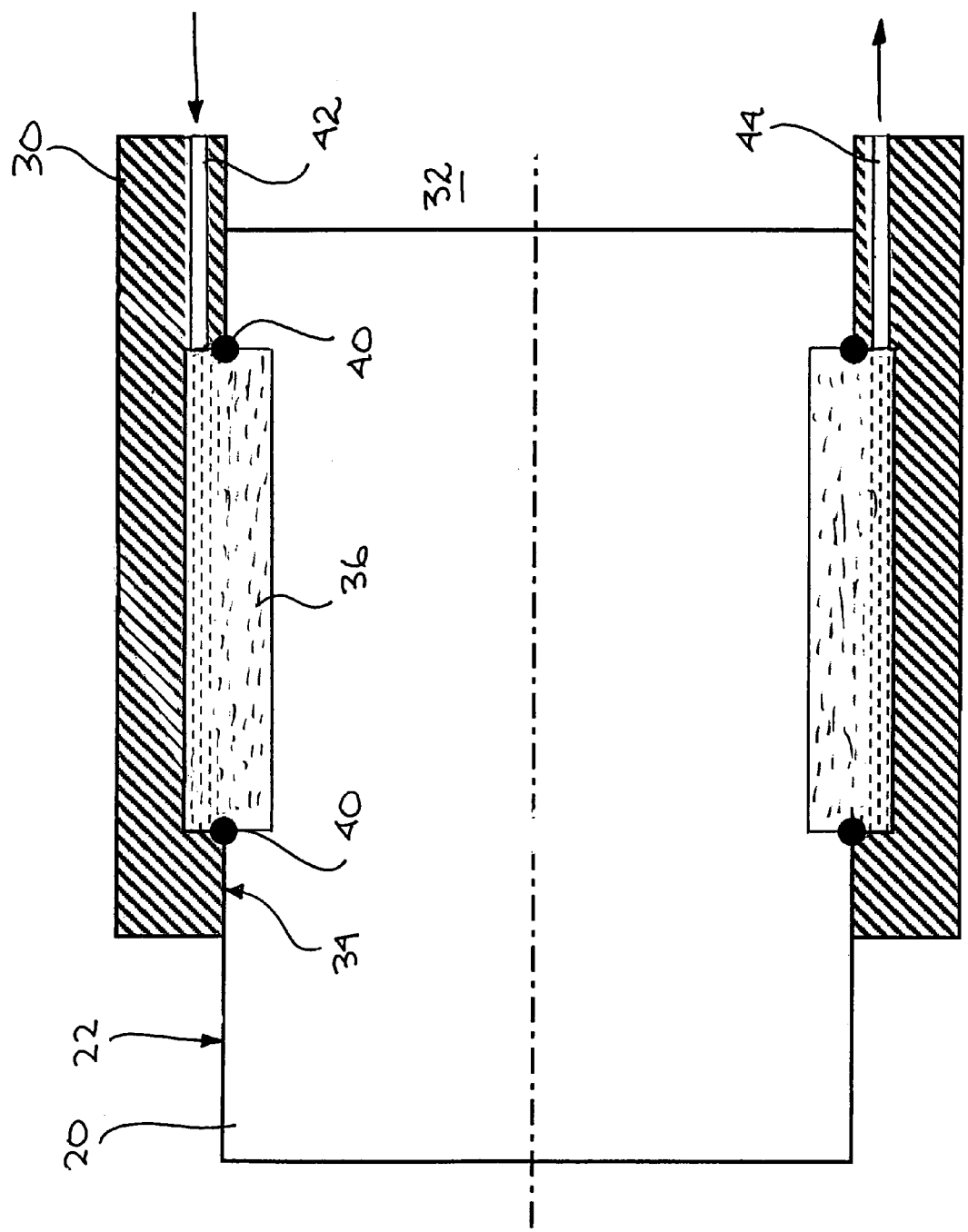
FIG. 4 is a view similar to FIGS. 2 and 3, showing another variant of the new arrangement.

An annular oil passage 36 is provided between the internal wall surface 34 of the AGB 30 and the external side wall surface 22 of the accessory 20. The embodiment illustrated in FIG. 2 shows the passage 36 being located in the internal wall surface 34 of the AGB 30. As shown in FIG. 3, passage 36 can also be defined in the external side surface 22 of the accessory 20, or passage 36 can also be defined by recesses in a combination of both surface 34 surface 22, as shown in FIG. 4, or simply by any internal space defined within the AGB and preferably immediately adjacent surface 34. Opposite o-ring seals 40 are provided at both ends to ensure sealing.

As can be appreciated, the arrangement described herein creates a cooling jacket around the accessory 20 and allows heat to be exchanged, which may negate the need for additional cooling means, such as internal oil passages inside the accessory 20.

Oil is provided by the gas turbine's oil system (not depicted in this Figure) to the annular oil passage 36 from at least one inlet oil passage 42, preferably located in the internal wall surface 34 of the AGB 30. Similarly, oil exits the annular oil passage 36 through at least one outlet oil passage 44 located in the internal wall surface 34 of the AGB 30, for return to the oil system. These inlet and outlet oil passages 42, 44 are preferably configured and disposed to generate a constant flow of oil in the various regions of the annular oil passage 36. The flow is preferably sufficient to provide the desired cooling to accessory 20.

Figure 5:
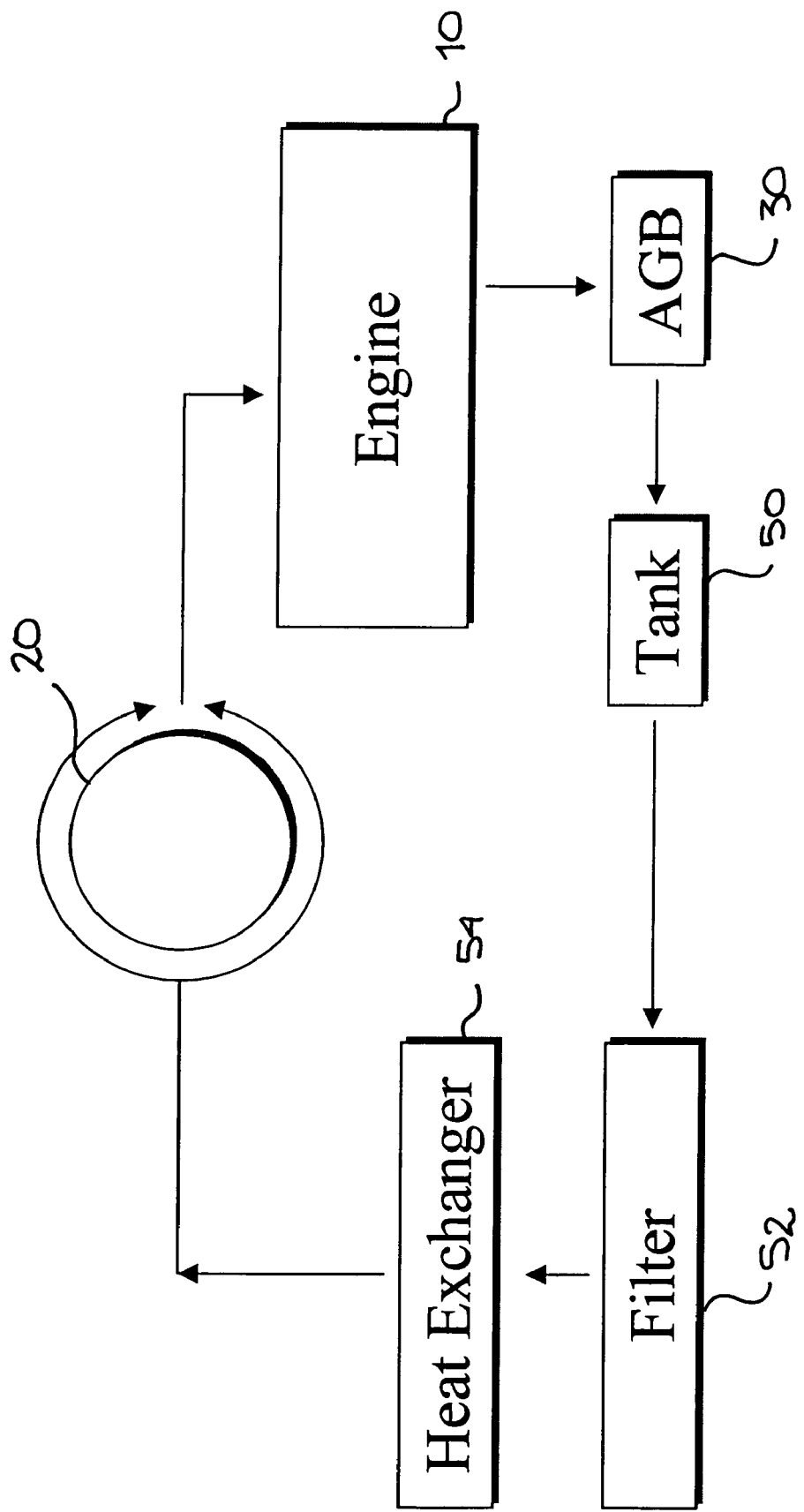
FIG. 5 is a block diagram illustrating an example of a coiling oil path of a gas turbine engine.

FIG. 5 schematically illustrates an overall example of an example oil circuit of a gas turbine engine 10. Oil is pumped from a tank 50 and sent to a filter unit 52. A heat exchanger 54 cools the oil. At least some of the oil is then provided to the accessory 20 for cooling thereof, preferably as described above. The oil then circulates to the bearing cavities of the engine 10, particularly in the various bearings therein. Oil is then supplied to the AGB 30 before being returned to the tank 50.

The above description is meant to be exemplary only, and one skilled in the art will recognize that changes may be made without departing from the scope of the invention disclosed. For example, the present invention is not limited to a single annular oil passage 36. Two or more oil passages can be used and may communicate in parallel or serially with the source. The shape of the annular oil passage 36 may be any desirable and is not necessarily with a purely circular path but can include spiral-shaped paths and/or other cooling-enhancing features such as trip strips, etc. Although oil is the preferred coolant with which the invention is used, any suitable cooling fluids may be used. Still other modifications will be apparent to those skilled in the art, in light of a review of the present disclosure, and such modifications are intended to fall within the scope of the appended claims.

What is claimed is:

1. A cooling system for accessory gearbox (AGB) of a gas turbine engine, the AGB having an internal wall surface defining a housing in which is located an accessory having an external side surface radially inward of the internal wall, the cooling system comprising:
    at least one coolant fluid passage located between the internal wall surface of the AGB and the external side surface of the accessory, the passage extending from at least one inlet to at least one outlet, the inlet and outlet being in fluid communication with a coolant fluid circuit, the coolant fluid being oil and the coolant fluid circuit including a main oil circuit communicating with at least one main bearing cavity in the engine.

2. The cooling system according to claim 1, wherein the accessory and the housing have a circular cross section.

3. The cooling system according to claim 1, wherein the internal wall surface of the AGB and the external side surface of the accessory define the coolant fluid passage.

4. The cooling system according to claim 1, wherein the fluid directly contacts the external side surface of the accessory to thereby cool the accessory.

5. The cooling system according to claim 1, wherein the accessory is substantially enveloped by the internal wall surface of the AGB.

6. A cooling system for accessory gearbox (AGB) of a gas turbine engine, the AGB having an internal wall surface defining a housing in which is located an accessory having an external side surface radially inward of the internal wall, the cooling system comprising:
    at least one coolant fluid passage located between the internal wall surface of the AGB and the external side surface of the accessory, the passage extending from at least one inlet to at least one outlet, the inlet and outlet being in fluid communication with a coolant fluid circuit, the accessory being sealingly received by the internal wall surface of the AGB.

7. The cooling system according to claim 6, wherein the fluid is a liquid coolant.

8. The cooling system according to claim 6, wherein the internal wall surface of the AGB and the external side surface of the accessory define the coolant fluid passage.

9. The cooling system according to claim 6, wherein the coolant fluid directly contacts the external side surface of the accessory to thereby cool the accessory.

10. The cooling system according to claim 6, wherein the accessory is substantially enveloped by the internal wall surface of the AGB.

* * * * *